United States Patent Office 3,105,744
Patented Oct. 1, 1963

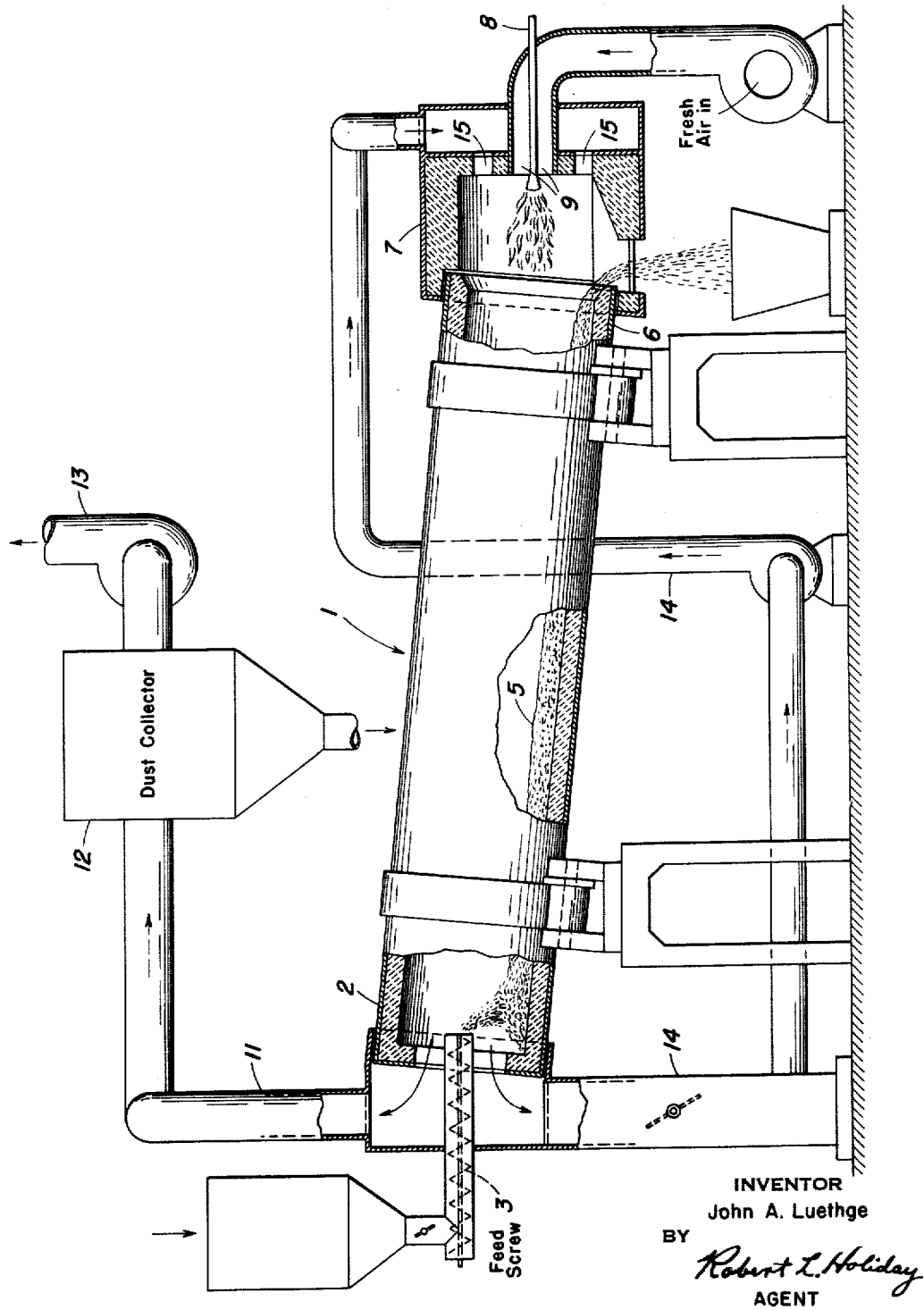

3,105,744
METHOD FOR PRODUCING CALCINED TITA-
NIUM DIOXIDE PIGMENT MATERIAL
John A. Luethge, Rockhill, Mo., assignor to National
Lead Company, New York, N.Y., a corporation of
New Jersey
Filed Dec. 6, 1961, Ser. No. 157,435
3 Claims. (Cl. 23—202)

This invention relates in general to a process for calcining finely divided titanium dioxide material. More specifically this invention relates to an improved process for producing calcined titanium dioxide pigments.

Titanium dioxide pigment material is usually produced commercially by calcining titanium hydrate in a substantially horizontal rotary kiln or calciner. A titanium hydrate obtained by hydrolysis of a titanium sulfate solution is fed into one end of the rotary kiln as a wet filter cake containing about 30–40% solids. The rotary calciner is raised slightly from the horizontal at the feed end of the kiln and the titanium hydrate is tumbled slowly along the length of the kiln to the lower end where it is discharged. At the discharge end of the kiln is located a combustion chamber in which a fuel such as oil or gas is burned with air in a burner which supplies sufficient heat to dehydrate the titanium hydrate and to form titanium dioxide of pigment quality in the calciner.

Titanium dioxide pigment material is very sensitive to slight variations in calcination temperatures and therefore it is necessary to obtain very close control of the temperature cycle employed. The final temperatures of calcination of titanium dioxide material may lie within the range of 800° C. to 1050° C. depending upon the type of pigment desired. It may be necessary however to regulate the final temperature of the titanium dioxide material to within a few degrees of temperature, say e.g. 10° C., in order to obtain optimum pigment properties of the product produced.

In commercial rotary calciners used for the manufacture of titanium dioxide pigment, all of the heat employed in the kiln is obtained by burning fuel with air in the combustion chamber located at the discharge end of the kiln. All of the combustion gases are passed through the length of the kiln and the heat from these gases calcines the hydrate as it passes through the kiln. The amount of heat required to calcine the hydrate is regulated by the amount of fuel and air burned in the combustion chamber. In order to transfer sufficient heat through the length of the kiln to dehydrate the titanium hydrate at the feed end of the kiln, a large excess of air is used to maintain sufficiently high temperatures throughout the length of the kiln. This excess air however increases the total volume and velocity of the gases passing through the kiln which in turn create undesirable problems, such as, excessive losses due to dusting and inefficient heat utilization, which results in uneconomical losses in the system. If, however, large excesses of air are not used, either the feed end of the kiln becomes too cold or excessive amounts of fuel have to be employed which overheats the pigmentary material in the discharge end of the kiln.

An object of the instant invention, therefore, is to provide a process for calcining titanium hydrate in a rotary kiln to produce high quality pigment material using a minimum amount of fuel for calcination. Another object is to provide a process for calcining titanium hydrate in an efficient manner in which a minimum amount of excess air is employed. A further object is to provide a process for producing titanium dioxide pigment material by calcining a titanium hydrate in a rotary kiln in which the transfer of heat throughout the length of the kiln is carried out in an efficient and economical manner. A still further object is to calcine a titanium hydrate in a rotary calciner by a process in which the rate of calcined pigment production is increased over normal commercial operations thereby obtaining a more economical calcination process. These and other objects will become apparent by the following more complete description of the instant invention.

In carrying out the process of the instant invention, a standard type of rotary kiln is employed. A cross sectional view of the kiln is shown in the drawing.

Referring to the drawing, the kiln comprises an elongated steel cylindrical chamber 1 suitably mounted and rotated on trunnions in a substantially horizontal position. The cylindrical chamber or kiln is raised slightly at its feed end 2 so that titanium hydrate, added by means of a screw conveyor 3 at the raised end, forms a bed 5 in the kiln which tumbles slowly throughout the length of the kiln and is removed from the kiln at the discharge end 6. A stationary combustion chamber 7 is positioned at the discharge end of the kiln. A burner 8 positioned inside the combustion chamber is adapted to burn either gas or oil and the flame produced by the burner provides the heat for calcining the titanium dioxide pigment passing through the kiln. Air is introduced at points 9 around the burner, and if desired a minor portion is mixed with the fuel in the burner, to burn the fuel and to provide sufficient velocities and volumes of gases to carry the necessary heat throughout the length of the kiln to dehydrate and calcine the titanium dioxide material. The exhaust gases from the kiln normally pass through conduit 11 into an electrostatic dust collecting system 12 for removing the dust particles from the exhaust gases which are expelled through stack 13.

In the instant invention a portion of the exhaust gases are fed through pipe 14 and returned into the combustion chamber 7 through ports 15.

The instant invention contemplates, in its broadest aspects, the following process improvements: maintaining in the pigmentary material in the kiln a 400° C. to 700° C. temperature gradient between a point 100 minutes from the discharge end of the kiln and the discharge end of the kiln, the temperature of the pigmentary material at the discharge end of the kiln being from 800° C. to 1050° C., the pigmentary material discharge temperature and said temperature gradient being maintained by recycling from 20% to 60% of the hot exhaust gases through said kiln by introducing said hot exhaust gases into the combustion chamber, adjusting the oxygen content of the kiln gases, including the recycled gases, to fall within the range of from 2% to 10% oxygen on a dry basis, burning sufficient fuel and fresh air in amount to maintain the temperature of the gases above the pigment material at the discharge end of the kiln at from 1000° C. to 1300° C., maintaining in said kiln exhaust gases from 30% to 50% water vapor, said water vapor being present in said kiln gases from the water vapor in the recycled exhaust gases, from the water vapor formed by drying the titanium hydrate and from the water vapor formed from the fuel being burned in the combustion chamber.

In using the prior art methods for calcining titanium dioxide pigment material, it has been found that it is necessary to employ from 9,000 to 10,500 cubic feet of fuel per ton of pigment material and to use 100% to 200% auxiliary air in excess of the stoichiometric amount to obtain a pigment temperature of 1,000° C. at the discharge end of the kiln, and to have kiln gases of sufficient volume and velocity to dry out the hydrate and to heat up rapidly the pigment material being calcined. When using these amounts of fuel and auxiliary air, the combustion gases in the kiln contain from 11% to 15% oxygen. The volume of stack gases leaving the kiln is about 800,000–1,100,000 cubic feet per ton of pigment material and the gases contain 15% to 25% water.

In contrast to the prior art method described above, it now has been found that by recirculating from 20% to 60% of the exhaust gases from the kiln, fuel consumption may be reduced to from 6,500 to 8,500 cubic feet per ton of pigment, and the amount of auxiliary air used may be reduced to from 10% to 90% in excess of the stoichiometric amount. The oxygen content of the combustion gases is lowered to from 2% to 10% and the total volume of stack gases are also reduced considerably.

In order to illustrate more fully the process of the instant invention the following examples are presented.

EXAMPLE 1

*Illustrating the Use of the Prior Art Calcination Method Described Above*

A rutile composite pigment containing 30% rutile $TiO_2$ and 70% calcium sulfate was prepared by calcining a composite hydrate in a rotary calciner 6.5 feet in diameter and 125 feet long. The calciner was rotated at 4.5 m.p.r. and 59 tons of calcined pigment were produced over a 24 hour period. 405 cubic feet per minute of natural gas at 15° C. were burned with 13,700 c.f.m. of air at 77° C. in the combustion chamber. This amount of air was 130% excess over the stoichiometric amount. The discharge temperature of the calcined pigment material was 960° C. and at 100 minutes from the discharge end was 440° C. The combustion gas temperature at the discharge end of the kiln was 1,060° C. The exhaust gases were discharged from the kiln at the hydrate feed end and were sent to a dust collecting system from which they were discharged up the stack. The oxygen content in the combustion gases was 12% and the exhaust gases contained 22.5% water.

Using these operating conditions 9,850 cubic feet of natural gas were consumed per ton of pigment calcined. A total of 37,000 c.f.m. of gases at 365° C. were discharged from the kiln and this volume of exhaust gases was processed through a dust collecting system before being discharged to the atmosphere.

EXAMPLE 2

*Illustrating the Use of the Calcination Process of the Instant Invention*

The same type of hydrate was calcined in the same rotary kiln as that described in Example 1. The calciner, however, was altered in design so that a portion of the exhaust gases discharged from the kiln were returned to the combustion chamber. These recycled gases were used in place of most of the auxiliary air used in Example 1. In this run 15,500 c.f.m. of the exhaust gases at 371° C. were recycled back to the combustion chamber. It was not necessary to pass this portion of the exhaust gases through the dust collecting system and hence was recycled without any dust removal. 370 c.f.m. of natural gas at 15° C. were burned with 4,600 c.f.m. of auxiliary air at 110° C. This amount of air is 50% excess over the stoichiometric amount. It was found that 65 tons of pigment per 24 hours could be produced using this calcination method. The discharge temperature of the calcined pigment was 960° C. and at 100 minutes from the discharge end was 430° C. The combustion gas temperature at the pigment discharge end was 1,020° C. The oxygen content of the gases in the kiln was 7.5%. The amount of water in the combustion gases was 26.4% and in the exhaust gases from the kiln was 38%. The total amount of exhaust gases which was passed through the dust collecting system was 25,000 c.f.m. at 371° C.

The quality of the calcined pigment produced by this method was substantially the same as that produced in Example 1.

It was found that a real contribution to the calcining art had been made since the following advantages were obtained:

(1) 8,200 cubic feet of natural gas instead of 9,850 cubic feet were used per ton of calcined pigment produced. This represents a fuel saving of 17%.

(2) Pigment production was increased 9% in the same size calciner.

(3) Total amount of exhaust gases was reduced from 37,000 c.f.m. at 365° C. to 25,000 c.f.m. at 371° C. thus lowering the burden on the dust collecting system.

EXAMPLE 3

*Illustrating the Prior Art Process in Calcining Another Titanium Hydrate*

Using the same calciner another titanium hydrate was calcined using the same prior art procedure except that in this run the pigment discharge temperature was maintained at 1,015° C. instead of 960° C.

57 tons of calcined pigment were produced over a 24 hour period. 380 c.f.m. of natural gas at 150° C. were burned with 13,000 c.f.m. of air at 71° C. in the combustion chamber. This amount of air was 110% excess over the theoretical amount required to burn the gas. The combustion gas temperature at the pigment discharge end of the kiln was 1145° C. The pigment temperature at discharge end was 1,015° C. and at the 100 minute point from the discharge end was 465° C.

The oxygen content in the combustion gases was 11.5% and the exhaust gases from the kiln contained 24% water. 9,600 cubic feet of natural gas per ton of pigment calcined were consumed. A total of 37,800 c.f.m. of gases at 426° C. were discharged from the kiln and this volume was processed through the dust collecting system.

EXAMPLE 4

*Illustrating the Process of the Instant Invention for Calcining the Titanium Hydrate*

Using the procedure described in Example 2 the titanium hydrate was calcined by using the process of the instant invention. In this run 40% or 17,000 c.f.m. at 446° C. of the kiln exhaust gases were recycled back to the combustion chamber. The dust was not removed from this gas before recycling. 340 c.f.m. of natural gas at 15° C. were burned with 4,100 c.f.m. of air at 88° C. This amount of air is 30% excess over the theoretical amount required to burn the gas. The pigment feed rate was increased so that 63 tons of calcined pigment material were calcined over a 24 hour period.

The pigment discharge temperature was 1,014° C. and at the 100 minute point was 465° C. The temperature of the combustion gases at the discharge end was 1,100° C. The oxygen content of the gases in the kiln was 5.5%. The amount of water in the combustion gases was 28.8% and in the exhaust gases from the kiln was 42.6%. The total amount of gases which passed through the dust collecting system was 24,500 c.f.m. at 446° C.

Again the quality of the calcined pigment material was substantially the same as that produced by the prior art method described in Example 3.

The results of this example showed the following advantages over that obtained by the prior art control run in Example 3:

(1) 7,750 cubic feet instead of 9,600 cubic feet of natural gas were used per ton of calcined pigment produced. This is a saving in fuel of 19%.

(2) Pigment production was increased 9.5% in the same size calciner.

(3) The total amount of exhaust gases from the system was reduced from 37,800 c.f.m. at 426° C. to 24,000 c.f.m. at 446° C. thus reducing considerably the burden on the dust collecting system.

From the above description and by the examples presented, it has clearly been shown that decided advances in the calcination art have been made by utilizing the process of the instant invention. The calcination of titanium hydrate may be carried out in a more efficient manner. Using the process of the instant invention, the calcination production rate may be increased and less fuel may be used per ton of pigment calcined. In addition smaller volumes of stack gases are produced thereby reducing the burden on a dust collecting system.

While this invention has been described and illustrated by the examples shown, it is not intended to be strictly limited thereto, and other variations and modifications may be employed within the scope of the following claims.

I claim:

1. In a process for producing calcined titanium dioxide pigment material in a substantially horizontal rotary kiln inclined sufficiently at one end to permit the flow of a titanium hydrate fed at the upper end of said kiln to tumble through the length of said kiln and to discharge from the kiln at the lower end, a combustion chamber positioned at the lower end of said kiln, a burner positioned in said combustion chamber, said burner producing sufficient heat in said kiln to dehydrate said titanium hydrate added and to form said calcined titanium dioxide pigment material, the calcination of said pigment material being carrier out in an oxidizing atmosphere in said kiln, the improvement which comprises: maintaining in the pigment material in the kiln a 400° C. to 700° C. temperature gradient between a point 100 minutes from the discharge end of the kiln and the discharge end of the kiln, the temperature of the pigment material at the discharge end of the kiln being from 800° C. to 1,050° C., said discharge temperature and said temperature gradient being maintained by returning from 20% to 60% of the hot exhaust gases from said kiln into said combustion chamber for recycling through said kiln, adjusting the oxygen content of the kiln gases including the recycled gases to fall within the range of from 2% to 10% oxygen gas on a dry basis, burning sufficient fuel and fresh air in amount to maintain the temperature of the gases above the pigment material at the discharge end of the kiln at from 1,000° C. to 1,300° C., and maintaining in said kiln exhaust gases from 25% to 50% water vapor, said water vapor being maintained in said kiln gases by the water vapor in the recycled exhaust gases, the water vapor formed from drying the titanium hydrate in the kiln and the water vapor formed from the fuel being burned in the combustion chamber.

2. Process according to claim 1 in which the recycled hot exhaust gases are returned to the combustion chamber without the removal of dust suspended in said gases.

3. Process according to claim 1 in which the amount of auxiliary fresh air employed is from 10% to 90% excess over the stoichiometric amount to burn the fuel.

References Cited in the file of this patent
UNITED STATES PATENTS 2,155,119    Ebner _____ Apr. 18, 1939
2,865,622    Ross _____ Dec. 23, 1958

UNITED STATES PATENT OFFICE
CERTIFICATE OF CORRECTION

Patent No. 3,105,744                                                  October 1, 1963

John A. Luethge

It is hereby certified that error appears in the above numbered patent requiring correction and that the said Letters Patent should read as corrected below.

Column 5, line 17, strike out "at one end"; line 26, for "carrier" read -- carried --.

Signed and sealed this 14th day of April 1964.

(SEAL)
Attest:
ERNEST W. SWIDER

Attesting Officer

EDWARD J. BRENNER

Commissioner of Patents